(12) United States Patent
Hyatt (10) Patent No.: US 11,574,400 B2
(45) Date of Patent: Feb. 7, 2023

(54) SYSTEM AND METHOD FOR AUTOMATED VISUAL INSPECTION

(71) Applicant: INSPEKTO A.M.V. LTD., Ramat Gan (IL)

(72) Inventor: Yonatan Hyatt, Tel-Aviv (IL)

(73) Assignee: INSPEKTO A.M.V. LTD., Ramat Gan (IL)

(*) Notice: Subject to any disclaimer, the term of this patent is extended or adjusted under 35 U.S.C. 154(b) by 139 days.

(21) Appl. No.: 17/257,588

(22) PCT Filed: Jul. 2, 2019

(86) PCT No.: PCT/IL2019/050734
§ 371 (c)(1),
(2) Date: Jan. 4, 2021

(87) PCT Pub. No.: WO2020/008457
PCT Pub. Date: Jan. 9, 2020

(65) Prior Publication Data
US 2021/0295491 A1    Sep. 23, 2021

Related U.S. Application Data

(60) Provisional application No. 62/693,937, filed on Jul. 4, 2018.

(30) Foreign Application Priority Data

Jul. 4, 2018  (IL) .......................................... 260417

(51) Int. Cl.
*G06T 7/00* (2017.01)
*G06K 9/62* (2022.01)
(Continued)

(52) U.S. Cl.
CPC ............ *G06T 7/001* (2013.01); *G06K 9/6256* (2013.01); *G06V 10/25* (2022.01); *G06V 20/52* (2022.01);
(Continued)

(58) Field of Classification Search
CPC ........... G06T 7/001; G06T 2207/30164; G06T 2207/30196; G06V 10/25; G06V 20/52; G06K 9/6256
See application file for complete search history.

(56) References Cited

U.S. PATENT DOCUMENTS 9,330,339 B2    5/2016  Hofman
9,729,824 B2*   8/2017  Cutler ................ H04N 5/23216
(Continued)

FOREIGN PATENT DOCUMENTS

EP    2801815     11/2014
JP    2005208890   8/2005
(Continued)

OTHER PUBLICATIONS

Islam et al., "Enhanced Automatic Surface and Structural Flaw Inspection and Categorization Using Image Processing Both for Flat and Textured Ceramic Tiles", International Journal of Computer Applications, Jun. 2012, 48(3), pp. 1-10, Foundation of Computer Science, New York, NY, USA.

*Primary Examiner* — Pinalben Patel
(74) *Attorney, Agent, or Firm* — Alphapatent Associates, Ltd; Daniel J. Swirsky (57) ABSTRACT

A method and system for automated visual inspection, include receiving, from a camera imaging an inspection line, an image of the inspection line. The image includes an item on the inspection line personal or confidential image data. A processor produces from the image of the inspection line a reduced image, which does not include the personal or
(Continued)

confidential image data, and inputs the reduced image to an inspection process.

14 Claims, 5 Drawing Sheets

(51) Int. Cl.
   *G06V 10/25* (2022.01)
   *G06V 20/52* (2022.01)
(52) U.S. Cl.
   CPC ............ *G06T 2207/30164* (2013.01); *G06T 2207/30196* (2013.01)

(56) References Cited

U.S. PATENT DOCUMENTS

| | | |
|---|---|---|
| 9,886,771 B1 | 2/2018 | Chen et al. |
| 2004/0008880 A1 | 1/2004 | Horie et al. |
| 2005/0062960 A1 | 3/2005 | Tsuji et al. |
| 2008/0181533 A1 | 7/2008 | Jung et al. |
| 2008/0317329 A1 | 12/2008 | Shibuya et al. |
| 2011/0107259 A1 | 5/2011 | Haugh et al. |
| 2012/0128230 A1* | 5/2012 | Maeda ............... G06T 7/001 382/145 |
| 2012/0155741 A1 | 6/2012 | Shibuya et al. |
| 2013/0177232 A1 | 7/2013 | Hirano |
| 2015/0064813 A1 | 3/2015 | Ayotte et al. |
| 2015/0221077 A1 | 8/2015 | Kawabata et al. |
| 2015/0355102 A1* | 12/2015 | Kido ............... G06T 7/0004 348/46 |
| 2017/0220241 A1 | 8/2017 | Vangapalli et al. |
| 2019/0114756 A1 | 4/2019 | Weiss et al. |
| 2019/0354772 A1* | 11/2019 | Tasli ............... G06V 10/82 |

FOREIGN PATENT DOCUMENTS

| | | | | |
|---|---|---|---|---|
| JP | 4008291 B2 | * | 11/2007 | ........... G06K 9/4647 |
| JP | 4695239 B2 | * | 6/2011 | ........... G01R 31/307 |
| TW | 201730843 A | * | 9/2017 | ........... G01N 27/04 |
| WO | WO2020100146 A1 | | 5/2020 | |
| WO | WO-2022074085 A1 | * | 4/2022 | |

* cited by examiner

SYSTEM AND METHOD FOR AUTOMATED VISUAL INSPECTION

FIELD

The present invention relates to automated visual inspection processes, for example, inspection of items during a production process.

BACKGROUND

Inspection during processes can be instrumental in ensuring the quality of the process. For example, inspection during production processes at manufacturing plants helps control the quality of products by identifying defects and then acting upon this identification, for example, by fixing the defect or discarding the defective part. During production, the process of defect detection is essential for quality assurance (QA) gating and sorting on production lines, and is consequently useful in improving productivity, improving production processes and working procedures, reducing defect rates, and reducing re-work and waste.

Systems that use imaging devices and image processors, generally referred to as machine vision systems, are used in inspection tasks, where a camera is set up to scan the process or item under inspection. Images obtained by the camera are then analyzed, for example, to detect defects in items.

Such machine vision solutions necessitate positioning and arranging of cameras and typically require a set up stage by an operator and/or set up crew. Images obtained by the cameras during the set up stage are recorded and viewed (e.g., via a closed-loop video system) for feedback regarding the positioning and arrangement of the cameras, ambient illumination, and other parameters important for setting up a machine vision system. The images are also recorded and viewed to enable monitoring by the operator or another reviewer to correct or improve the set up process, if necessary. These images, which are obtained during the set up stage, almost always include views of the crew involved in setting up and other surroundings and background which are not relevant for the set up or for the following inspection process.

Consequently, images obtained during the set up stage and during the following inspection stages, typically include personal and/or confidential information, such as one or more crew people or parts of bodies of crew people, machinery or parts of the machinery used at the manufacturing plant and other background depicting the environment of the inspection line and plant. The use of these images, which are obtained during visual inspection processes, may be extremely restricted, due to security policies and/or privacy regulations.

Since use of images obtained during the set up stage and during the following inspection stages, is essential in visual inspection processes, restrictions on the use of these images may harm and even bring the inspection process to a halt, causing irreparable damage.

SUMMARY

Embodiments of the invention enable automated visual inspection which does not use image data that includes personal or confidential information. Embodiments of the invention enable recording and/or storing and/or displaying and/or otherwise using images obtained during a visual inspection process without using personal or confidential information.

In one embodiment personal and/or confidential information is removed from images obtained during an inspection process, prior to use of the images.

In one embodiment, a method for automated visual inspection includes receiving, from a camera imaging an inspection line, an image of the inspection line. A processor then produces from the image of the inspection line a reduced image, which does not include personal or confidential image data. The reduced image is then input to an inspection process.

An inspection process, which may be a current process and/or a future process, may include defect detection and/or other processes or steps assisting in defect detection.

In one embodiment, a system for automated visual inspection of an item includes a camera configured to obtain an image of an inspection line and a processor in communication with the camera and with a storage device to receive an image of the inspection line, the image including personal or confidential information. The processor produces a reduced image from the image of the inspection line, which includes no personal or confidential information. The processor stores the reduced image in the storage device; and retrieves the reduced image from the storage device to employ in an inspection process.

Thus, images of an item on an inspection line or other images of an inspection line may be used in inspection processes, while maintaining privacy and confidentiality of the production plant and personnel.

BRIEF DESCRIPTION OF THE FIGURES

The invention will now be described in relation to certain examples and embodiments with reference to the following illustrative figures so that it may be more fully understood. In the drawings.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "analyzing", "processing," "computing," "calculating," "determining," "detecting", "identifying", "creating", "producing", or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Unless otherwise stated, these terms refer to automatic action of a processor, independent of and without any actions of a human operator.

In embodiments of the invention, personal and/or confidential information is removed from images obtained during an inspection process, prior to use of the images. "Use of the images" may include use during a current inspection process, for example, displaying the images to show defects detected during a running, current, inspection process and/or future use, for example, storing images for post-inspection processes, such as review of an inspection session, for improving the process, for obtaining statistics or other big data from the images, etc.

In some embodiments, the inspection process relates to an item, for example, an item in a delivery assembly line, an item inspected during production, and others. In some examples, the item is detected in images obtained during the inspection process, enabling removal of portions of the image that do not include the item or that are not related to the item.

The following examples relate mainly to an inspection process during production, however, it should be appreciated that embodiments of the invention may be used with inspection processes of other lines or operations.

As exemplified herein, a processor may receive image data (obtained by one or more cameras) of an item on an inspection line, for example, during a production line inspection process, a process which typically includes detecting one or more defects on items on the inspection line.

A defect may include, for example, a visible flaw on the surface of the item, an undesirable size of the item or part of the item, an undesirable shape or color of the item or part of the item, an undesirable number of parts of the item, a wrong or missing assembly of interfaces of the item, a broken or burned part, an incorrect alignment of the item or parts of the item, a wrong or defected barcode, and in general, any difference between the defect-free sample and the inspected item, which would be evident from the images to a user, namely, a human inspector. In some embodiments, a defect may include flaws which are visible only in enlarged or high resolution images, e.g., images obtained by microscopes or other specialized cameras.

A production line (or other lines, such as a delivery line) inspection process, typically occurring at a manufacturing plant (or at the delivery center, e.g., at a post office), may include a set up stage prior to an inspection stage. The set up stage may include obtaining images of known samples of items to enable training or learning of the samples, prior to the inspection of unknown items. Additionally, the set up stage may include obtaining images of an item on the inspection line, or even only of the inspection line, to determine the appropriate values of inspection line parameters. For example, inspection line parameters may include positioning of a camera in relation to the inspection line, distance of the camera from the imaged items, location of the imaged items within the camera field of view, exposure time, focus, illumination, etc.

In one exemplary embodiment, the set up stage includes obtaining images of samples of a same-type manufactured item with no defects (defect-free items) on an inspection line, to enable detection of these same items during the ensuing inspection stage. For example, the set up stage may include using an image to determine allowed locations of the item in the image and/or to determine features of the item (e.g., spatial properties and uniquely representing features or attributes of a defect free item in images) from the image and/or to determine imaging parameters (e.g., exposure time, focus and illumination).

In other embodiments, the set up stage may include obtaining images of samples of known and/or specific defects to enable a machine learning system to train on the known defects.

Images obtained at the set up stage (also termed set up images or reference images) are analyzed by a processor and are then typically used as a reference for detection algorithms running at the inspection stage.

In the inspection stage, images of unknown items are obtained to determine if the item is defected and/or to determine where the defect is and/or which type of defect it is.

Use of images obtained during the set up stage and/or inspection stage, e.g., as described above, is essential in automated visual inspection processes. However, these images are obtained by cameras set up manually, usually with no awareness or concern for privacy or confidentiality issues. Thus, these images may cover the item being inspected, but also the item's surrounding and background, which may include personal and/or confidential information, which is irrelevant for the inspection process.

As demonstrated below, embodiments of the invention enable automated visual inspection which does not use personal or confidential information.

Figure 1A:
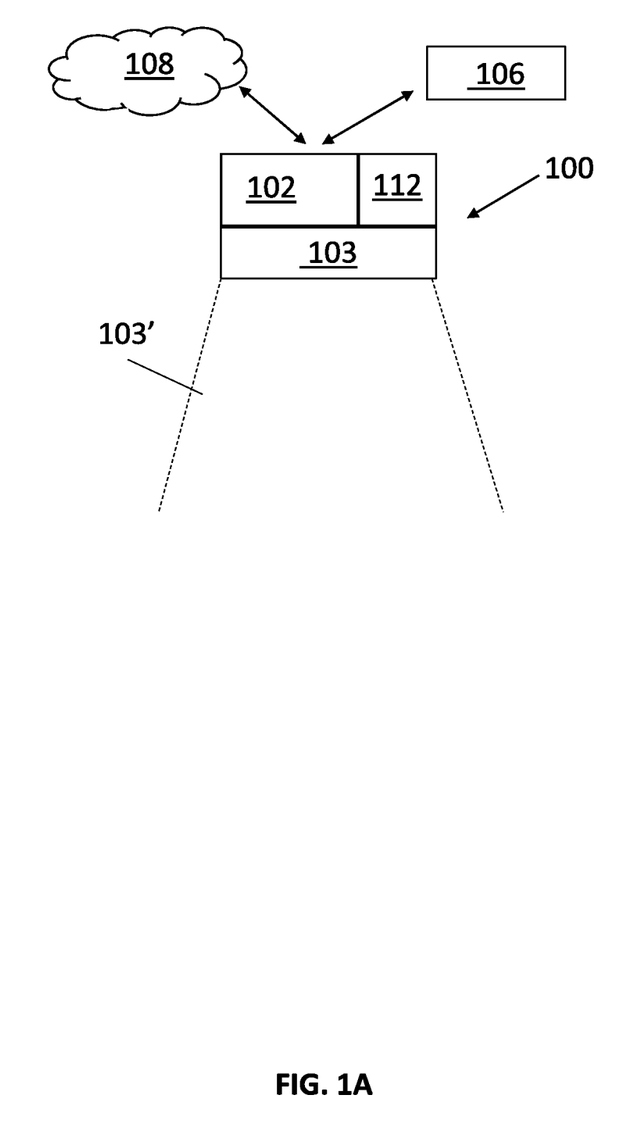
FIGS. 1A and 1B schematically illustrate a system, operable according to embodiments of the invention.
Figure 1B:
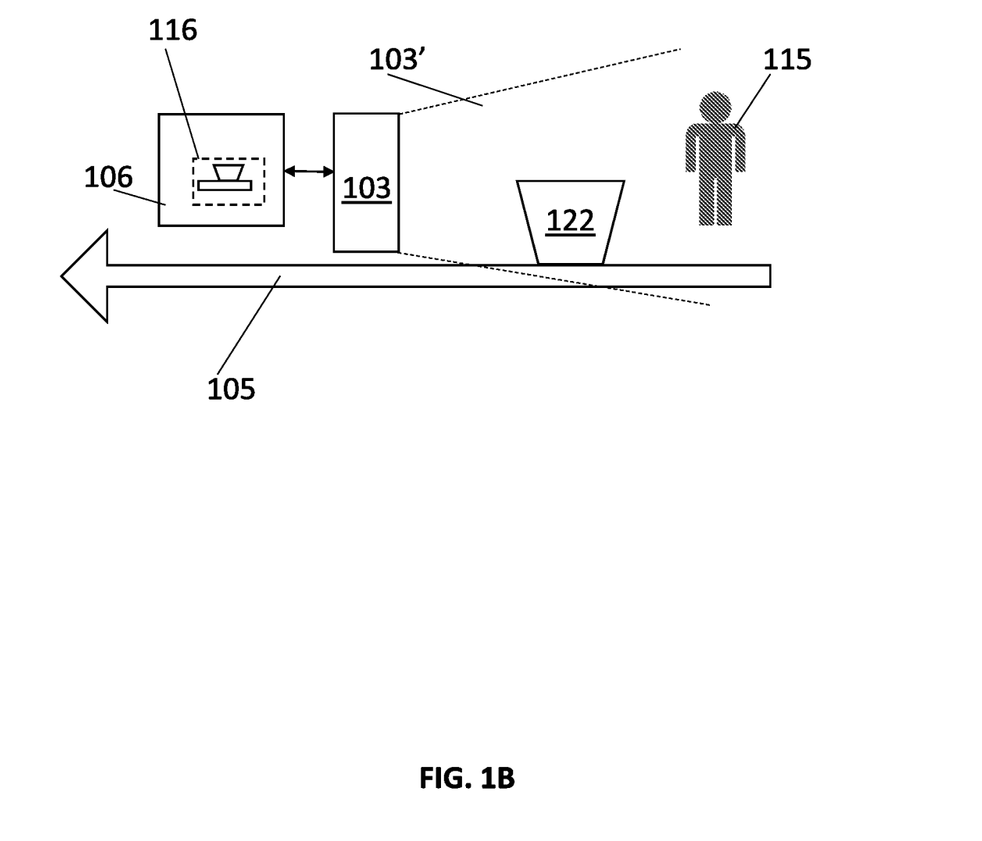

A system for inspecting items on an inspection line, while maintaining privacy and confidentiality, according to one example of the invention, is schematically illustrated in FIGS. 1A and 1B.

Exemplary system 100, which may be used for automated visual inspection of an item, includes a processor 102 in communication with one or more camera(s) 103 and with a device, such as a user interface device 106 and/or other devices, such as storage device 108. Camera(s) 103, which are configured to obtain an image of an inspection line, are typically placed or positioned in relation to an inspection line 105 (e.g., a conveyer belt), such that items placed on the inspection line 105 are within the FOV 103' of the camera 103.

Camera 103 may include a CCD or CMOS or other appropriate chip. The camera 103 may be a 2D or 3D camera. In some embodiments the camera 103 may include a standard camera provided, for example, with mobile devices such as smart-phones or tablets. In other embodiments the camera 103 is a specialized camera for obtaining high resolution images.

Processor 102 receives image data (which may include data such as pixel values that represent the intensity of reflected light as well partial or full images or videos) of the inspection line 105 from the one or more camera(s) 103 and runs processes according to embodiments of the invention.

In one embodiment the processor 102 receives an image of inspection line 105, which includes an item and background image data, which includes personal and/or confidential information. The processor 102 produces, from the received image, a reduced image, which includes information about the inspected item but includes reduced or no background image data. In one embodiment the reduced image includes information about the item but no personal or confidential information.

In one embodiment, information about the item includes image data of the item or of part of the item (e.g., image data of the defect area(s) of the item but not of the rest of the item, or image data of a region of interest, as further described below).

In another embodiment information about the item includes a representation (typically a visual representation) of information rather than the image data itself. For example, a representation may include a mark, such as an icon or color, to indicate status of the item in the image of the inspection line, status of detection of a defect or other status of the inspected item. Thus, the reduced image may include information about the item but no image data.

In some embodiments information about the item may include a status of detection of the item (e.g., indicating that the item is not correctly positioned) and/or indication of status of detection of a defect on the item.

In one embodiment processor 102 controls a device, such as user interface device 106 and/or storage device 108 or another device.

In one embodiment processor 102 controls the user interface device 106 to display the reduced image during an inspection process. For example, displaying the reduced image may enable an operator to correct inspection line parameters based on the displayed images, may alert an operator to a problem with the inspected item (e.g., an incorrect positioning of the item), may alert the operator to the detection of a defect on the items, etc.

In another embodiment processor 102 stores the reduced image, for example, at storage device 108, which is in communication with the processor 102 and which may be a local device or a remote device, for example, located in the cloud. Reduced images stored at storage device 108 or at another device may be archived and retrieved, for later use, to employ in an inspection process to obtain defect detection on the item or in post-inspection processes, such as, monitoring inspection processes, repeating an inspection process session using the same parameters as a previous session, data mining, and more.

Processor 102 may communicate with a device, such as storage device 108 and/or user interface device 106 via a controller, such as a programmable logic controller (PLC), typically used in manufacturing processes, e.g., for data handling, storage, processing power, and communication capabilities. A controller may be in communication with processor 102, storage device 108, user interface device 106 and/or other components of the system 100, via USB, Ethernet, appropriate cabling, etc. Thus, components of system 100 may be in wired or wireless communication and may include suitable ports and/or network hubs.

The user interface device 106 may include a monitor or screen displaying instructions and/or notifications to a user (e.g., via text or other content displayed on the monitor). In another example, the user interface device 106 may include a light that may light up or change color based on the signal generated by processor 102. In yet another example, the user interface device 106 includes an audio player to emit a sound based on the signal generated by processor 102. In other embodiments user interface device 106 may include other suitable media by which to communicate with a user.

In some embodiments user interface device 106 may be part of a multi purpose device such as a smart-phone, tablet or personal computer.

In some embodiments user interface device 106 is in communication with storage device 108, possibly, via processor 102 and/or via a PLC, as described above, for example, to display reduced images stored in storage device 108.

Storage device 108 may be a server including for example, volatile and/or non-volatile storage media, such as a hard disk drive (HDD) or solid-state drive (SSD).

In some embodiments processor 102 can accept user input (e.g., input from an operator of the inspection line), e.g., via user interface device 106. User interface device 106 may be designed to receive the user input. For example, user interface device 106 may include a monitor and keyboard and/or mouse and/or touch screen, to enable a user to input additional feedback. For example, if during an inspection process an item in an inspection image is erroneously detected by processor 102 as defected, a user may provide feedback (e.g., via user interface device 106) that the inspection image is of a defect-free item and not a defective item. In other examples, a user may provide feedback that an item classified as defect free is in fact a defective item. Thus, user interface device 106 may accept user input on a reduced image displayed on the user interface device 106. In these cases, based on the user input, processor 102 may use this feedback to update and improve the inspection process.

In another example, a monitor and keyboard and/or mouse associated with user interface device 106 may be used by a user to define a region of interest in a reduced image, e.g., a set up image. Thus, a reduced image may be displayed to the user on the monitor and the user may then use the keyboard, mouse, touchscreen, or other input device to mark one or more region(s) of interest (ROI) on the displayed reduced image. Based on this user input processor 102 may limit or focus analysis to the marked region of interest.

In some embodiments processor 102 may create a reduced image based on a marked ROI, as further described below.

Processor 102 may include, for example, one or more processors and may be a central processing unit (CPU), a graphics processing unit (GPU), a digital signal processor (DSP), a microprocessor, a controller, a chip, a microchip, an integrated circuit (IC), or any other suitable multi-purpose or specific processor or controller.

Processor 102 is typically in communication with a memory unit 112. In one embodiment the memory unit 112 stores executable instructions that, when executed by the processor 102, facilitate performance of operations of the processor 102, as described herein. Memory unit 112 may also store at least part of the image data received from camera(s) 103.

Memory unit 112 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

In one embodiment, memory unit 112 is a volatile memory on which images obtained by camera 103 are saved prior to being reduced. In one embodiment memory unit 112 is inaccessible, except to perform reduction of the images. After the images are reduced they may be stored in a non-volatile, long term storage (e.g., storage device 108). Thus, image data obtained by camera 103, which includes personal and/or confidential information, is not accessible whereas information about an inspected item is accessible for further use.

FIG. 1B schematically illustrates the system 100 operative during an inspection process in which item 122 is placed on the inspection line 105 within the FOV 103' of camera 103. FOV 103' also includes operator 115.

Processor 102 receives an image of the inspection line 105, which includes the item 122 and background image data, which includes personal and/or confidential information (e.g., image data of operator 115). Processor 102 creates from the image a reduced image 116, for example, by reducing the background image data, such that operator 115 and/or any other visual information which is not relevant to the inspection process, is not present in the reduced image 116. The processor 102 may then cause the reduced image 116 to be displayed on user interface device 106 and/or processor 102 may use the reduced image 116 in additional processes (as described herein), e.g., to detect a defect on the item.

The reduced image 116 may include the item 122 or the item 122 and a predetermined periphery of the item (e.g., a periphery defined by a polygon enclosing the item and some pixels proximate to the item). Alternatively, the reduced image 116 may include a portion of the item, for example, the reduced image 116 may include only an ROI.

ROIs may be created, for example, by using polygons, bounding boxes, circles and/or adding holes to all of the above. In some embodiments both a user indication and automatic algorithms may be used to create an ROI. For example, pixel level segmentation may be used, or automatic segmentation may be used to split the image to different objects and allow the user to choose the segments representing the ROI. In another example, a user may mark a bounding box and an automatic algorithm then creates a polygon tightened to the object border closest to the bounding box, or the algorithm may create a polygon from a user chosen segment, etc.

Figure 2:
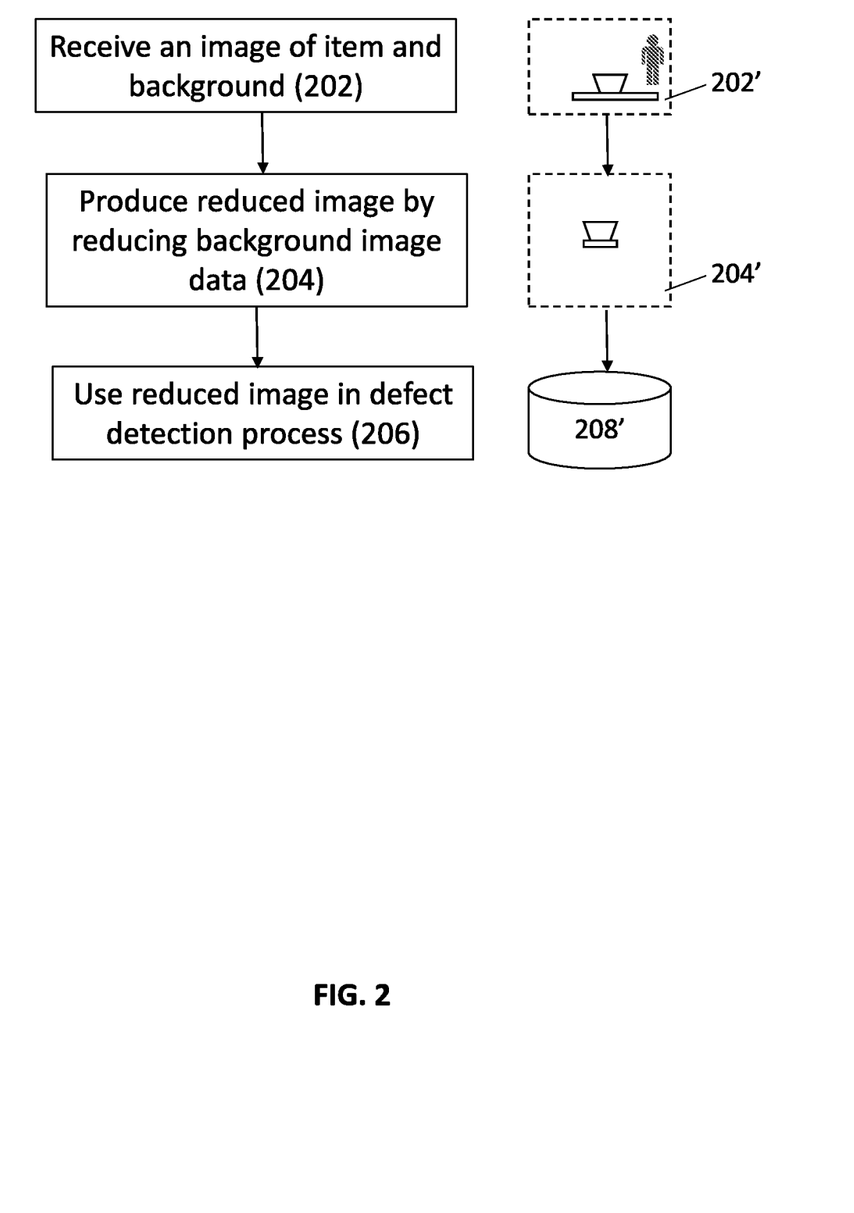
FIG. 2 schematically illustrates a method for inspecting items on an inspection line, according to an embodiment of the invention.

A method for inspecting items on an inspection line, according to an embodiment of the invention, is schematically illustrated in FIG. 2. The method, which may be carried out by processor 102, includes receiving an image 202' of the item on an inspection line (step 202). The image 202' includes the item and background image data (which includes personal and/or confidential or any image data that is undesirable to display and/or store). The processor then produces a reduced image 204' (step 204) which includes the item and reduced (or eradicated) background image data and uses the reduced image in a defect detection process (step 206), for example, by storing the reduced image in storage device 208' to be later used in a defect detection process. In one example, a reduced image can be used in a defect detection process by applying a machine learning process to the reduced image to detect a defect on the item.

In some embodiments, image 202' may be used in inaccessible processes whereas reduced image 204' is used in accessible processes. For example, processes occurring in a single machine with no communication or interface with an operator may use an unreduced image (e.g., image 202'). However, reduced images (e.g., reduced image 204') are used in accessible processes, such as long term storage for later use and/or displaying the image.

In some embodiments the reduced image is displayed and the displayed reduced image is used in the defect detection process.

The reduced image may be displayed in a currently running inspection process and/or in a future, later, inspection process. Thus, according to embodiments of the invention a method may include receiving an image of the inspection line in a first inspection process and displaying a reduced image in a second inspection process (e.g., in another session of a single inspection process and/or in a different or later inspection process of same-type items).

The step (204) of producing a reduced image may occur at any stage of the inspection process; e.g., at the set up stage or inspection stage.

In one embodiment an image of the inspection line is received in a set up stage and the reduced image produced from the image of the inspection line is input to the inspection process at the inspection stage (e.g., a machine learning process may be applied to the reduced image to detect a defect on the item at the inspection stage).

The reduced image 204' may be stored in device 208' together with additional information relating to the image and/or imaged item. The additional information may be used in an inspection process, e.g., to enable retrieval of the reduced image from storage, to assist in use of the reduced image in a specific inspection session, to assist in using the reduced image in defect detection, etc. The additional information may include, for example, meta-data, such as product number/name; ROIs names; Barcode; QR code and the like; temporal information, etc.

Some examples of additional information include:
Information regarding boundaries of the imaged item, as defined by a user and/or by a processor;
Information regarding ROIs in the image, such as, order of inspection (in a case of a plurality of ROIs in a single image), which action should be taken upon detection of a defect in an ROI and so forth;
Compositional properties of the imaged item, such as properties relating to rotation and scale and interest points on the item, such as parts of the item that move independently of other parts of the item, areas of the image that show a high level of difference, and so on;
Information regarding detection of defects in the image;
Information regarding the time/date of the image;
Information regarding illumination parameters of the image.

The additional information may be retrieved and possibly displayed together with the reduced image corresponding to the information.

In one embodiment processor 102 can produce a reduced image by detecting the item in the image (e.g., in image 202') and producing an image of substantially only the item or creating a representation of the image data of the item. Thus, processor 102 can create a representation of information relating to the item in image 202'. For example, an icon or other mark may be created to represent the item and/or a status of the item.

Figure 3:
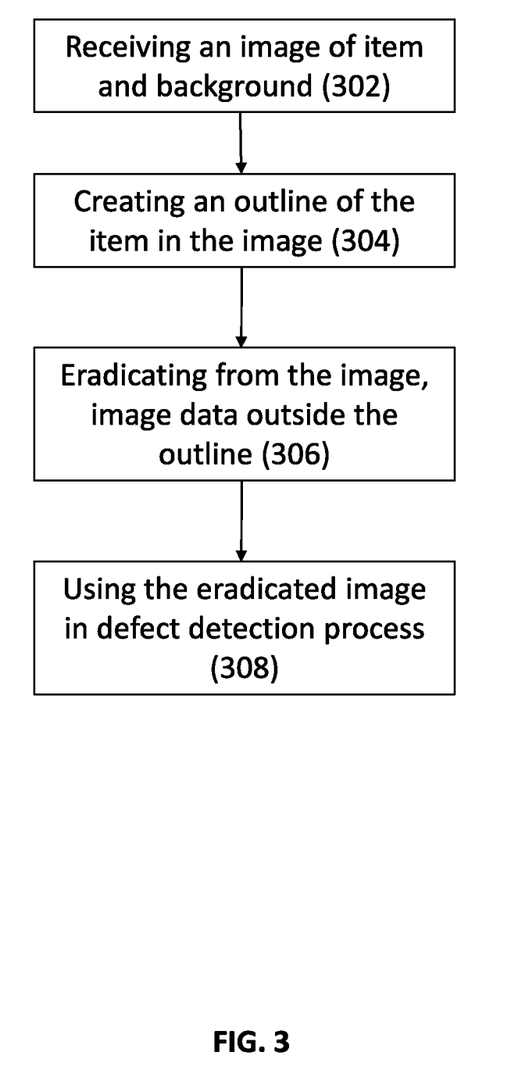
FIG. 3 schematically illustrates a method for inspecting items on an inspection line, using a reduced image, according to an embodiment of the invention.

In a method, according to one embodiment of the invention, which is schematically illustrated in FIG. 3, an image of an item is received (302). The received image may include the item and background image data, which includes personal and/or confidential information. An outline of the item is created (304) and image data outside the outline is eradicated (306) to create a reduced or eradicated image. The eradicated image may then be used in defect detection or other inspection processes (308).

In one embodiment the item is detected by using computer vision techniques such as by applying a machine learning process or an object detection algorithm (e.g., using known color detection or other known object detection algorithms or machine learning techniques) on the image to detect the item and create an outline enclosing the detected item.

In another example of using computer vision techniques, reference images are collected in a set up stage to obtain an essentially complete representation of an item or type of item. The reference images may be analyzed to collect representing information of the item, e.g., information regarding possible 2D shapes and 3D characteristics (e.g., rotations on the inspection line) of an item. Alternatively or in addition, the analysis may be used to find uniquely discriminative features of the item and the spatial relation between these unique features, as preserved between the set up images and/or items having high variability in their appearance (e.g., objects which have high shape tolerance in the manufacturing process, high textural variance on the surface of the object as an outcome of the manufacturing process, etc.) and more. The representing information collected from the reference images can then be used to detect a same type item in a new image.

In other embodiments the outline of the item, which may be a bounding box or other polygon or bounding shape, may be input by a user (e.g., via user interface device 106).

The method may include eradicating all the image data of the image outside the outline. In some embodiments the outline of the item may include the item and a predetermined periphery of the item (e.g., a certain amount of pixels surrounding the boundary of the item).

In another embodiment, the outline of the item includes only a portion of the item. For example, the outline may be created around an ROI, which may be input by a user or may be automatically generated by a processor, as described above. For example, an ROI may include the area of a defect. Thus, once a defect is detected in the image, by the processor, an outline may be created (by the user or automatically by the processor) enclosing the area of the detected defect. Other ROIs may relate to compositional properties of the imaged item or interest points on the item, e.g., as described above.

In some embodiments an object detection algorithm is applied on the image to detect the item and/or other predetermined objects in the image (e.g., people or parts of people (e.g., face), machinery, etc.). The background image data may be reduced or eradicated by obliterating or scrambling or otherwise making unreadable image data of predetermined objects in the image. For example, the predetermined objects may include humans and/or specific machinery. Humans and/or machinery detected in an image may be deleted from the image to produce a reduced image, which may be further used (e.g., displayed and/or stored) without invoking privacy or confidentiality issues.

Figure 4:
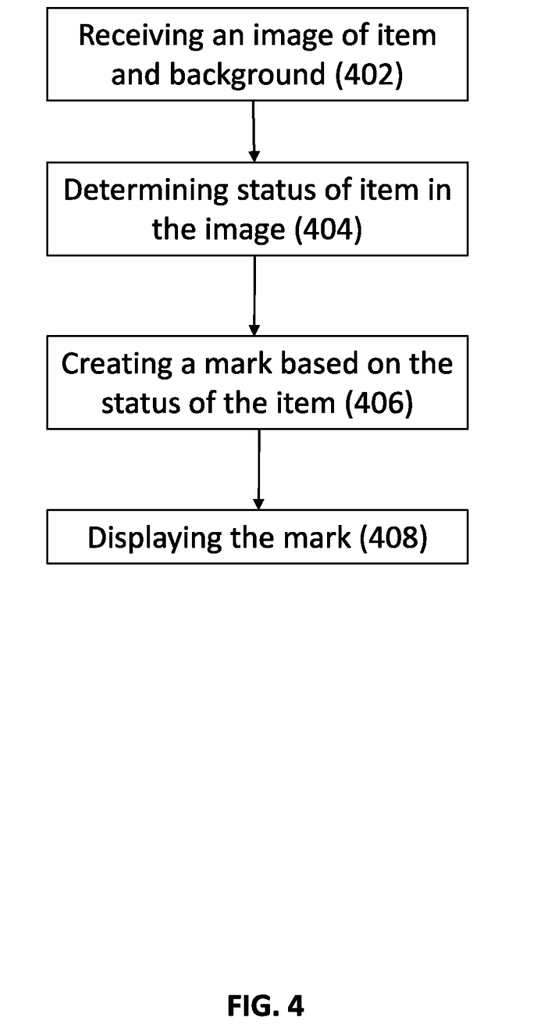
FIG. 4 schematically illustrates a method for inspecting items on an inspection line, using a reduced image, according to another embodiment of the invention.

In a method, according to another embodiment of the invention, which is schematically illustrated in FIG. 4, an image of an item is received (402). The received image may include the item and background image data, which includes personal and/or confidential information. The status of the item in the image is determined (404) and a mark is created based on the determined status (406). The mark is then used in an inspection process. For example, the mark may be displayed (408), instead of displaying image data of the item and background). In other embodiments the mark may be stored, instead of the image data of the item and its background.

The status of the item in the image may relate to properties of the item, for example, if a defect has been detected in the item the status of the item may be "defected". If no defect was detected the status may be "defect free". Other properties of the item may include compositional properties of the imaged item, for example, as described above. For example, a mark may indicate if there are parts of the item moving independently of other parts of the item or points of interest in the item. The mark may indicate a number of moving parts (or points of interest), their location in the image, etc.

By using reduced images, according to embodiments of the invention, images can be used in visual inspection processes at a plant or other location without invading privacy of personnel at the location and/or without disclosing information relating to the environment at the location.

The invention claimed is:

1. A method for an automated visual inspection process that comprises a set up stage prior to an inspection stage, the method comprising:
using a processor to:
receive an image of an item on an inspection line in the setup stage,
collect representing information of the item from the image,
detect a same-type item on the inspection line in a new image, based on the representing information,
produce from the new image a reduced image in which image data outside the same-type item is eradicated, and
input the reduced image to the inspection process, at the inspection stage.

2. The method of claim 1 comprising creating an outline of the same-type item in the new image and eradicating the image data outside the outline.

3. The method of claim 2 comprising detecting the same-type item in the new image using computer vision techniques and creating the outline based on the detection of the same-type item.

4. The method of claim 2 wherein the outline of the same-type item includes the same-type item and a predetermined periphery of the same-type item.

5. The method of claim 2 wherein the outline of the same-type item includes only a portion of the same-type item.

6. The method of claim 2 wherein the outline of the same-type item is input by a user.

7. The method of claim 1 comprising applying a machine learning process to the reduced image to detect a defect on the same-type item in the inspection process.

8. The method of claim 1 wherein using the processor to input the reduced image to the inspection process comprises displaying the reduced image.

9. The method of claim 1 wherein using the processor to input the reduced image to the inspection process comprises storing the reduced image and using the stored reduced image in the inspection process.

10. The method of claim 1 wherein using the processor to input the reduced image to the inspection process comprises storing the reduced image and using the stored reduced image in a post-inspection process.

11. The method of claim 1 wherein the set up stage comprises one of: using the image of the inspection line to determine allowed locations of the item in the image, using the image of the inspection line to determine features of the item from the image and using the image of the inspection line to determine imaging parameters.

12. The method of claim 1 wherein the reduced image comprises information about the same-type item but no image data.

13. The method of claim 12 wherein the information about the same-type item comprises an indication of status of detection of the same-type item in the new image.

14. The method of claim 12 wherein the information about the same-type item comprises an indication of status of detection of a defect on the same-type item.

* * * * *